UNITED STATES PATENT OFFICE.

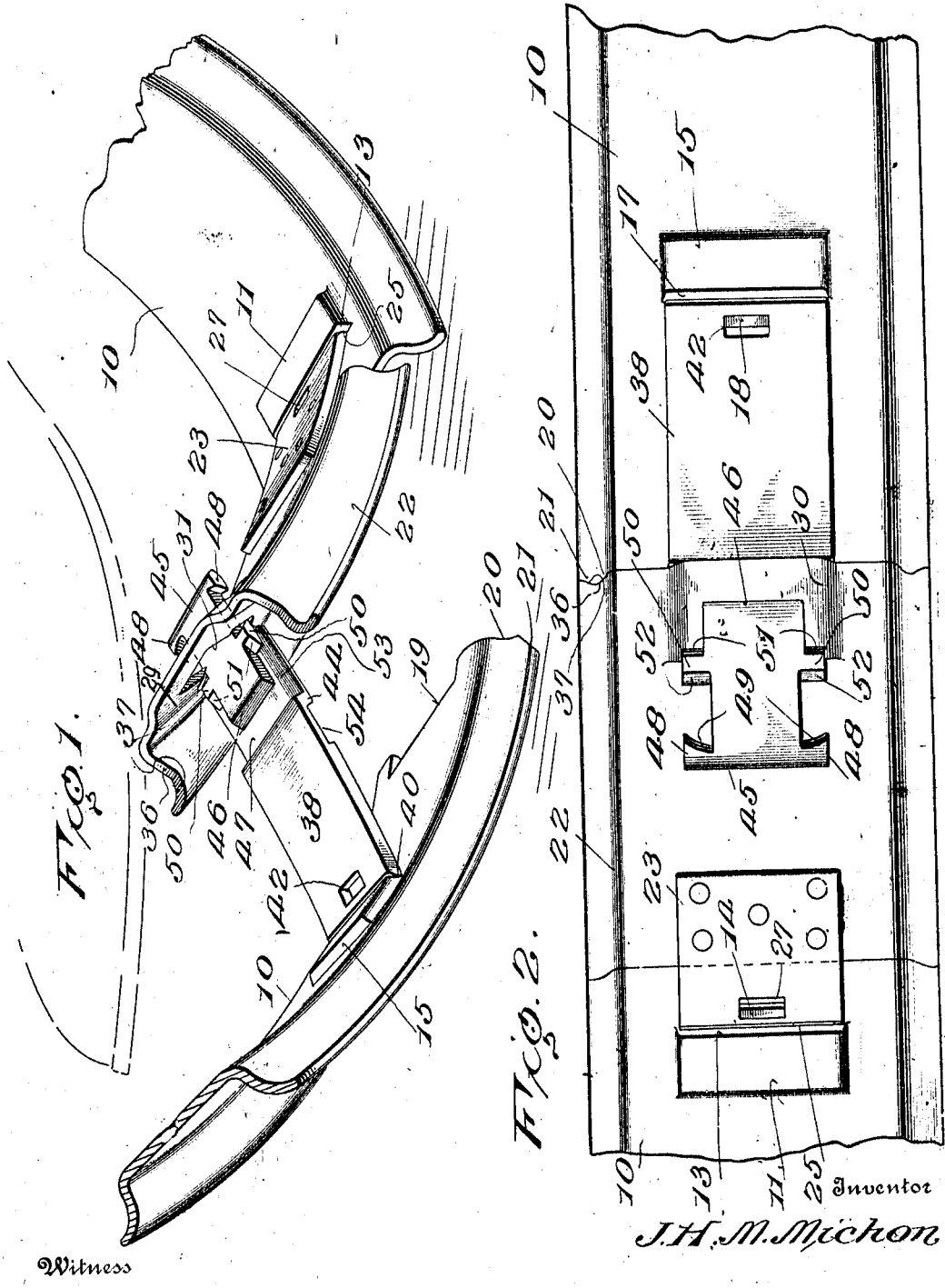

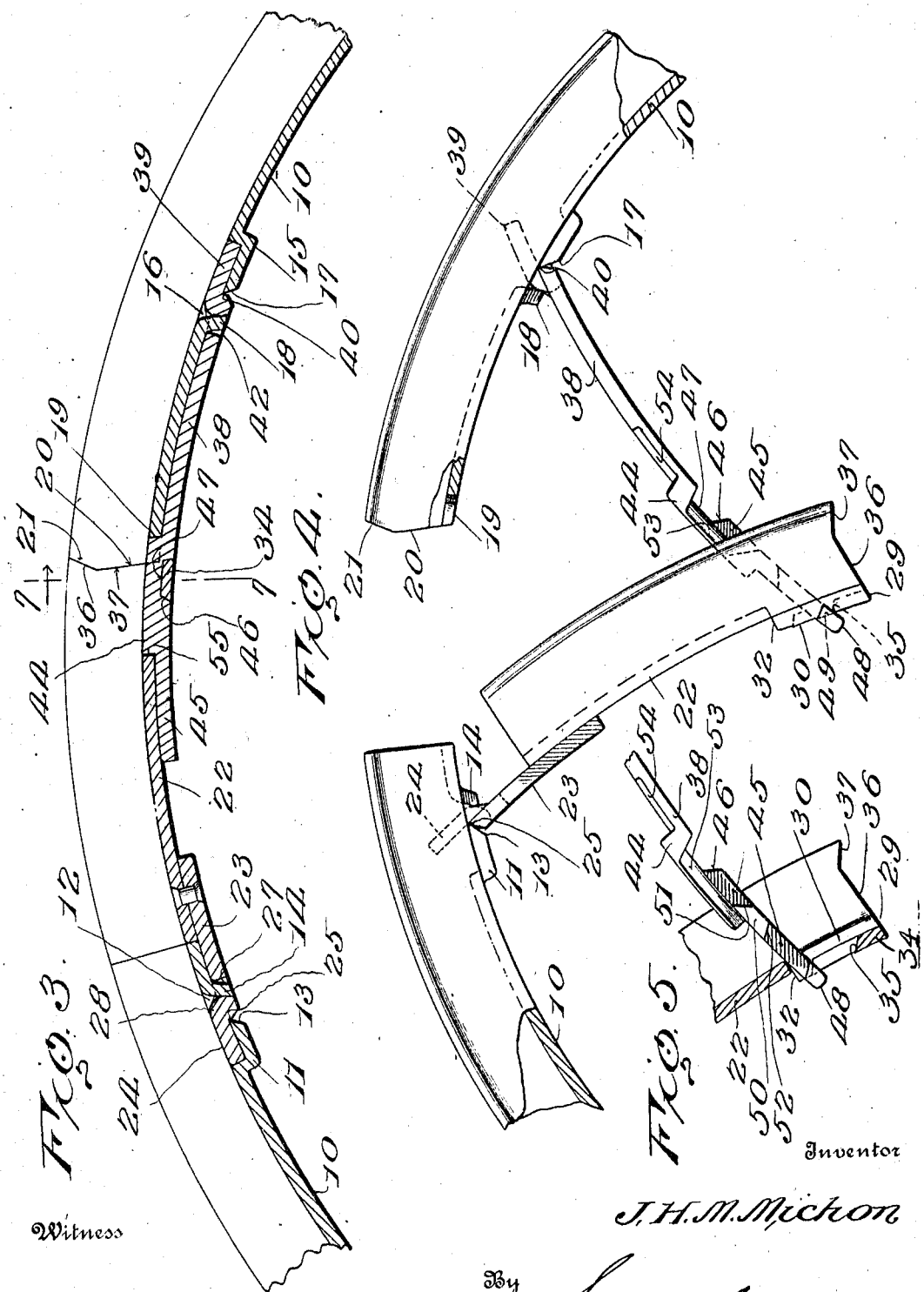

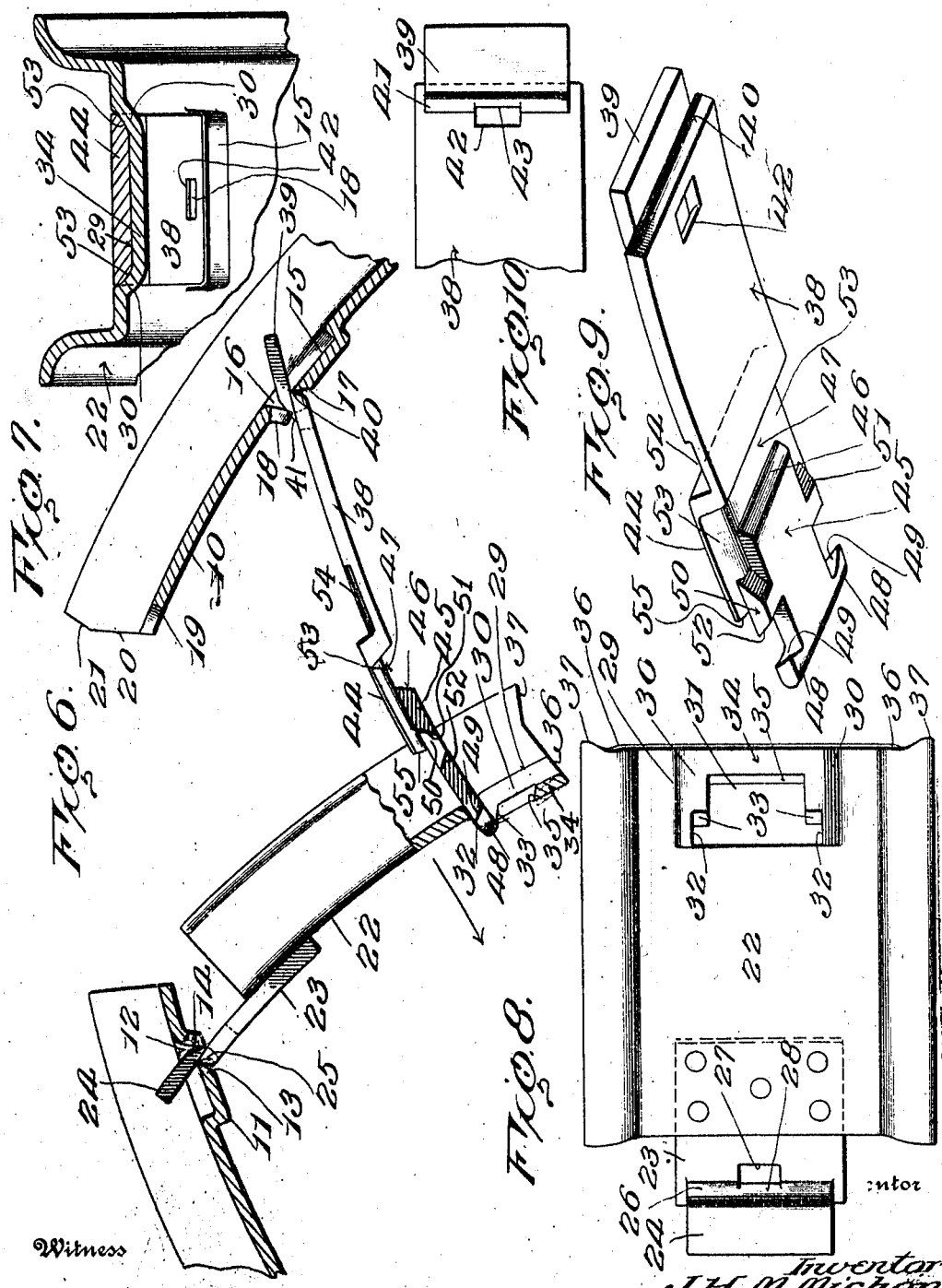

JOSEPH H. M. MICHON, OF WASHINGTON, DISTRICT OF COLUMBIA

COLLAPSIBLE WHEEL-RIM.

1,314,416.  Specification of Letters Patent.  Patented Aug. 26, 1919.

Application filed April 2, 1918. Serial No. 226,230.

*To all whom it may concern:*

Be it known that I, JOSEPH H. M. MICHON, a citizen of the United States, residing at Washington, District of Columbia, have invented certain new and useful Improvements in Collapsible Wheel-Rims, of which the following is a specification.

This invention relates to an improved demountable wheel rim for motor vehicles and has as its primary object to provide a construction wherein the rim may be easily and quickly collapsed so that a tire may be readily placed upon or removed from the rim.

The invention has as a further object to provide a construction employing a pivoted rim section and coacting link plate and wherein the said rim section and link plate will be hingedly connected with each other and with the rim body without the use of any pivot pins or other frail elements such as would be liable to rust and break in use.

A still further object of the invention is to provide a construction wherein the hinged rim section and link plate will be normally locked in engagement with the rim as well as in engagement with each other but wherein the said hinged rim section and link plate may be moved to a position to freely separate as well as to be freely detached from the rim so that the said rim section and link plate may, without the use of any special tools and with a minimum of difficulty, be displaced from the rim.

And the invention has as a still further object to provide a construction wherein the rim body may be pressed out by a single operation and wherein the rim section and link plate will also be of simple design so that any problems of manufacture will be eliminated and the rim capable of ready production at minimum cost.

Other and incidental objects will appear as the description proceeds. In the drawings wherein I have illustrated the preferred embodiment of the invention, and wherein similar reference characters designate corresponding parts throughout the several views:

Figure 1 is a fragmentary perspective view showing the manner in which the hinged rim section of the rim may be swung to inactive position for collapsing the rim, Fig. 2 is a fragmentary plan view showing the hinged rim section swung to active position, Fig. 3 is a longitudinal sectional view showing the disposition of the parts when the hinged rim section is swung to active position, Fig. 4 is a side elevation partly broken away and showing the hinged rim section swung to inactive position, Fig. 5 is a detail sectional view particularly bringing out the manner in which the hinged rim section and link plate employed are normally locked against disengagement and consequently also normally locked against disengagement from the rim body, Fig. 6 is a fragmentary sectional view showing the rim body expanded to permit the disengagement of the rim section and link plate and their detachment from the rim body, Fig. 7 is a transverse sectional view taken on the line 7—7 of Fig. 3 and looking in the direction of the arrows, Fig. 8 is a plan view showing the hinged rim section in detail, Fig. 9 is a perspective view showing the link plate in detail, and Fig. 10 is a fragmentary plan view of the inner end of the link plate.

In carrying out the invention I employ a split resilient rim body 10 which may be of any approved type. Struck inwardly from the bottom wall of this rim body adjacent one end thereof is a transversely extending socket 11 at the forward side of which is formed a slot 12 opening through the bottom wall of said socket. The bottom wall of the socket at the inner side of the slot is, as particularly shown in Fig. 2 of the drawings, provided with a beveled edge 13 and struck from the bottom wall of the rim body at the opposite side of said slot and at a point substantially midway of the ends thereof, is a tangentially disposed lug 14 extending inwardly and inclining toward the slot. Inwardly struck from the bottom wall of the rim body in spaced relation to its opposite end is a socket 15 similar to the socket 11 and formed at its forward side with a slot 16 similar to the slot 12. At the inner side of this slot the bottom wall of the socket is formed with a beveled edge 17 corresponding to the beveled edge 13 of the slot 12 and struck from the bottom wall of the rim body at the outer side of the slot 16 and at a point substantially midway of the ends thereof is an inwardly directed tangential lug 13 inclining toward the slot 16 and similar to the lug 14. At the adjacent end of the rim body the bottom wall thereof is, as particularly shown in Fig. 1, formed with a notch 19 and the contiguous end edges of the side flanges of the rim body are, throughout the major portion of their width, provided with inclined portions 20 and are thence formed, at their outer margins, with tangential portions 21 inclining away from the opposite end of the rim body. The purpose in thus forming the adjacent end edges of the flanges of the rim body will presently appear. However, it will now be clear that the rim body may be pressed out or formed at a single operation and may consequently be readily produced.

In connection with the rim body I employ a rim section 22 adapted to fit between the ends of the rim body to complete the continuous contour thereof. This rim section is shown in detail in Fig. 8 of the drawings. Integrally formed on the bottom wall of the said rim section at its inner end, or otherwise secured thereto, is a longitudinally projecting hinge plate 23 offset at its outer end to form a somewhat reduced overlying stop lug 24 projecting longitudinally from the inner extremity of the plate. Beneath the said stop lug the adjacent end edge of the plate is, as particularly shown in Figs. 3 and 6, provided at its inner margin with a straight shoulder 25 while the outer margin of the said edge is beveled. The inner end of the stop lug, at the upper side of the plate, is formed with a beveled shoulder 26. Formed through the plate at the bottom of this latter shoulder, at a point substantially midway of the ends of the said shoulder, is an opening 27 provided with a rounded inner end wall 28 continued across the face of the shoulder. Struck inwardly from the bottom wall of the rim section at the end thereof opposite the hinge plate 23, is a longitudinally disposed socket 29 opening upon the adjacent end edge of the rim section. This socket is provided with transversely curved or inclined side walls 30 and formed through the bottom wall of the said socket medially thereof is a longitudinally directed opening 31. At the inner end of this opening lateral notches 32 are formed in the side walls of the said socket so that the opening 31 is of substantially T-shape. At their forward ends the notches 32 are provided with beveled shoulders 33 and as will now be observed, the opening terminates short of the outer end of the socket to define a cross strip 34. At its outer end the opening 31 is provided with a beveled wall 35. In order that the outer end of the rim section may fit the end of the rim body at which the side flanges of the said body are formed with the edge portions 20 and 21, the adjacent end edges of the side flanges of the rim section are formed with inclined portions 36 similar to the inclined portions 20 of the flanges of the rim body and are thence provided with tangentially inclined portions 37 similar to the inclined portions 21 of the said rim body flanges.

Formed to coact with the hinged rim section is a link plate 38 which is longitudinally curved to conform to the curvature of the rim body and the said rim section. This link plate is offset at its inner end to provide a somewhat reduced stop lug 39 corresponding to the stop lug 24 of the hinge plate 23 of the rim section and adapted to fit within the socket 15 of the rim body. Beneath the stop lug 39, the adjacent end edge of the plate is formed at its inner margin with a straight shoulder 40 corresponding to the shoulder 25 of the plate 23, while the outer margin of such edge is beveled. The inner end of the stop lug, at the upper side of the plate, is formed with a beveled shoulder 41 corresponding to the shoulder 26 of the stop lug 24. Formed through the link plate at the base of the shoulder 41 and at a point substantially midway of the ends thereof is an opening 42 provided with a curved outer wall 43 extending across the face of the said shoulder. Adjacent its outer end the link plate is formed with an outwardly offset portion defining a locking block 44 and at the outer end of said block is again offset inwardly to provide a somewhat reduced longitudinally projecting hinge plate or connecting tongue 45 extending beneath the block upon the lower side thereof. At its inner end the tongue 45 is formed with a beveled shoulder 46 which, in connection with the offset in the plate at the inner end of the block 44, defines a transverse socket or channel 47 upon the lower side of the plate. The tongue 45 is of a width to be freely received within the opening 31 in the socket 29 of the hinged rim section and at its outer end portion is reduced to fit loosely through the said opening while the channel 47 is of a width to snugly receive the cross strip 34 of the said socket. Formed on the outer end of the tongue 45 are oppositely directed lateral lugs 48 adapted to be loosely received through the notches 32 in the side walls of the socket. This tongue is thus of substantially T-shape to engage within the opening 31 and, as particularly shown in Fig. 9, the lugs 48 are provided with longitudinally inclined and transversely curved inner edges 49. Formed on the side edges of the tongue to intersect the plane of the outer end edge of the block 44 are oppositely directed pivot lugs 50 adapted to fit within the notches 32 and provided with beveled inner shoulders 51 adapted to confront the shoulders 33 of the said notches. Opposite the shoulders 51 the lugs 50 are formed with beveled outer shoulders 52 adapted to ride over the shoulders 33 of the said notches. From the ends of the channel 47, the side edges of the tongue 45 at its inner extremity, and the ends of the pivot lugs 50, the side margins of the block 44 are cut away upon the inner side of the said block to provide beveled shoulders 53 adapted to fit the inclined side walls 30 of the socket 29. Upon its outer side the hinge plate is further provided at the inner end of the said block with oppositely inclined cut away portions 54 opening upon the edges of the plate. The purpose of these cut away portions will presently appear. At its outer end the block 44 defines a shoulder 55.

In assembling the rim body, rim section and link plate, the rim body is first abnormally expanded as shown in Fig. 6, and, if desired, a suitable expanding device may be provided for this purpose. The stop lug 24 of the rim section is then inserted through the slot 12 of the rim body by holding the rim section at right angles to the adjacent end of the rim body when, upon the engagement of the shoulder 25 of the hinge plate 23 with the edge 13 of the said slot, the rim section is swung outwardly to bring the wall 28 of the opening 27 in the hinge plate into engagement with the lug 14. In a similar manner the stop lug 39 of the link plate 38 is inserted through the slot 16 in the opposite end of the rim body when, upon engagement of the shoulder 40 of the said plate with the edge 17 of the slot, the link plate is swung outwardly to bring the wall 43 of the opening 42 in the link plate into engagement with the lug 18 of the rim body. The free ends of the rim section and link plate are then brought together in the manner shown in Fig. 6 when the lugs 48 of the tongue 45 of the link plate are passed through the notches 32 in the side walls 30 of the socket 29 of the rim section to confront the outer sides of the said side walls and the tongue thus engaged through the opening 31 of the said socket. Upon the release of the rim body and its consequent return to normal contracted position, all the parts will, as shown in Fig. 4 of the drawings, be operatively connected.

Attention is now directed to the fact that when the rim body is thus contracted the lugs 14 and 18 of the rim body will coact with the walls 28 and 43 of the openings 27 and 42 to pivotally connect the rim section and link plate at their inner ends with the rim body. At the same time, the reduced outer end portion of the tongue 45 of the link plate will be held to engage through the opening 31 of the socket 29 of the rim section by the lugs 48 of the said tongue so that the tongue will thus act to pivotally connect the rim section and link plate at their meeting ends. Furthermore, particular attention is directed to the fact that when the rim body is normally contracted, as shown in Fig. 4, the rim section and link plate will occupy a position at an acute angle to each other so that upon shifting of the tongue 45 to the inner end of the opening 31 of the socket 29, the inner end edge of said opening will, as shown in detail in Fig. 5 of the drawings, engage with the tongue to prevent clearance of the inner ends of the side walls 30 of the socket at the notches 32 by the lugs 48 of the tongue. In other words, the lugs 48 of the tongue will be prevented from moving into register with the notches 32 so that the rim body will thus act to yieldably hold the rim section and link plate locked together. The rim section and link plate will, therefore, coact to provide a toggle and by disposing these elements in the position shown in Fig. 1 of the drawings and pressing inwardly upon the inner ends thereof, the said rim section and link plate will be caused to expand the extremities of the rim body and shift the rim section to fit, as shown in Figs. 2 and 3 of the drawings, between the ends thereof. In this connection it will be noted upon an inspection of Figs. 1 and 6, that when the rim section is disposed in inactive position ready to be swung between the ends of the rim body, the shoulders 52 of the lugs 50 will engage the side walls 30 of the socket 29 in advance of the notches 32 for supporting the rim section and hinge plate to pivot one upon the other. Then, as the rim section is swung outwardly and the said rim section and link plate assume a position in alinement with each other, the said shoulders will slide along the said side walls and, when the rim section and link plate cross their pivotal center, in the outward movement thereof, the said shoulders will direct the lugs 50 into the notches 32. Upon the shifting of the lugs 50 into the notches 32, the shoulder 55 at the forward end of the block 44 will be moved to engage with the wall of the opening 30 of the socket 29 at the inner end of the said opening and will rock thereon, as the rim section continues in its outward swinging movement for pivotally supporting the rim section and link plate with respect to each other. Under such continued outward movement of the rim section, it will thus be seen that when the lugs 50 have moved into the notches 32, the shoulders 51 of the said lugs will then confront the shoulders 33 of the said notches to ride thereover, so that the outward movement of the rim section may progress until the block 44 has shifted to seat within the socket 29 of the rim section at its outer side and engage the tongue 45 flat against the inner side of the rim section. At the same time, the cross strip 34 of the rim section will be moved to engage within the socket 47 of the hinge plate so that the rim section will thus be limited in its outward swinging movement, fitting snugly between the ends of the rim body. Thrust upon the hinge plate 23 of the rim section, when the said rim section is thus swung outwardly will, of course, be supported by the shoulder 25 of the said hinge plate bearing against the wall 13, of the slot 12 around which wall the shoulder will rock, while thrust upon the inner end of the hinge plate will be supported by the shoulder 40 bearing against the wall 17 of the slot 16 around which latter wall the shoulder 40 will rock. Outward swinging movement of the rim section will thus be unhampered, and, as will be clear, as the said rim section is so swung outwardly, the lugs 14 and 18 of the rim body will be received within the openings 27 and 42 of the rim section and link plate respectively while the stop lugs 24 and 39 of the said hinge plate and link plate will be swung to snugly engage within the sockets 11 and 15 respectively of the rim body. It will accordingly be seen that when the rim section is disposed in active position, as shown in Figs. 2 and 3 of the drawings, the link plate will lie flat against the inner side of the rim body while, as previously stated, the tongue 45 of the said plate will lie flat against the inner side of the rim section. Also, the stop lugs 24 and 39 of the hinge plate 23 and link plate 38 will lie within the sockets 11 and 15 of the rim body flush with the outer side thereof, while the block 44 will fit snugly within the socket 29 of the rim section to also lie flush with the outer side of the rim body, engaging within the notch 19 at the adjacent end of the rim body for locking the free end of the rim section against transverse movement. Furthermore, the ends of the rim section and rim body will abut so that a continuous and smooth joint will thus be formed between the rim body and the rim section. In this connection attention is directed to the fact, as particularly shown in Fig. 3 of the drawings, that, in the active position of the rim section, the lugs 14 and 18 of the rim body will engage within the openings 27 and 42 of the hinge plate 23 and link plate 38 respectively, while the shoulders 51 of the pivot lugs 50 will coact with the shoulders 33 of the notches 32 in the side walls of the socket 29 of the rim section, for rigidly holding the rim body against expansive movement. At the same time, the shoulder 35 at the inner edge of the cross strip 34 will coact with the shoulder 46 at the inner end of the tongue 45 to further rigidly hold the rim body against such movement. As the hinged rim section is swung outwardly to active position the inclined portions 37 of the outer end edges of the side flanges of the rim section will, of course, be swung across the inclined portions 20 of the adjacent end edges of the side flanges of the rim body to engage with the inclined portions 21 of the said edges of the rim body flanges. Consequently, in order that the rim section may be displaced, the rim body must be expanded sufficiently to clear these engaging inclined edge portions. Thus, owing to the tension of the rim body against the ends of the rim section when normally expanded to receive the said section, these coacting inclined edge portions of the side flanges of the rim section and rim body will provide an effective lock holding the rim section against accidental displacement. The purpose of these cut away edge portions therefore now becomes apparent.

Assuming now that it is desired to collapse the rim, an ordinary screw driver or other suitable tool is inserted in one or the other of the cut away portions 54 of the link plate 38, when, by prying inwardly upon the said plate, the free end of the rim section will be caused to ride out of engagement with the adjacent end of the rim body. The purpose of the cut away portions 54 therefore now also becomes apparent. As soon as the rim section passes the pivotal center of the said section and link plate, the tension of the rim body thereon will serve to spring the said rim section inwardly to inactive position. Owing to the extreme resilient action of the rim body tending to thus swing the rim section inwardly, it will be clear that said rim section will be moved to its inactive position with considerable force. Accordingly, the lugs 48 are provided with the longitudinally inclined and transversely curved faces 49 to fit the outer sides of the side walls 30 of the socket 29 of the rim section so that as the rim section reaches the limit of its inward movement and the lugs 48 are brought into engagement with the said side walls to arrest such movement, the said lugs will have a firm bearing with the said side walls to consequently prevent distortion of the side walls as well as breaking off of the lugs. The walls 13 and 17 of the slots 12 and 16 of the rim body are beveled as are also the outer margins of the outer end edges of the hinge plate 23 and link plate 38 so that these plates may freely swing inwardly with respect thereto. I, therefore, provide an arrangement wherein the rim may be easily and quickly collapsed so that a tire may be readily placed upon or removed from the rim. Furthermore, collapsing of the rim may be effected without the use of any special tools. Also, should either the rim section or link plate become broken, or their efficiency otherwise impaired, the said section or link plate may, as will be readily understood, in view of the previous description, be easily disconnected and detached from the rim.

Having thus described the invention, what is claimed as new is:

1. A device of the character described including a rim body provided with lugs, a rim section having a hinge plate provided with a shoulder, a link plate pivotally connected to the rim section and provided with a shoulder, the shoulders of the said plates being engaged by the lugs of the rim body to pivotally connect the rim section and link plate thereto for movement to spread the rim body and shift the rim section to a position fitting between the ends thereof, the rim section and link plate being movable with respect to the rim body for swinging the said shoulders out of engagement with the said lugs and freeing the rim section and link plate.

2. A device of the character described including a split rim body, a rim section pivoted upon the rim body adjacent one end thereof and movable to a position to be released from the rim body, a link plate pivoted upon the rim body adjacent its opposite end and movable to a position to be released from the rim body, and a pivotal connection between the link plate and rim section adapted to freely separate at one position of the rim section and link plate with respect to each other but normally locked together for locking the rim section and link plate upon the rim body, the rim section and link plate being movable with respect to each other for expanding the rim body and shifting the rim section to a position fitting between the ends thereof.

3. A device of the character described including a split rim having slots formed therein adjacent its ends, lugs projecting from the rim body adjacent said slots, a rim section having a hinge plate projecting through one of said slots and provided with an opening having a wall thereof engaged by the adjacent lug of the rim body for pivotally connecting the rim section with the rim body, a link plate projecting through the other of said slots and provided with an opening having a wall thereof engaged by the other of the lugs of the rim body for pivotally connecting the link plate with the rim body, the link plate and rim section being movable with respect to the rim body for shifting the said walls of the said slots out of engagement with the said lugs to free the rim section and link plate, and a pivotal connection between the link plate and rim section, the said link plate and rim section being movable for spreading the body of the rim and shifting the rim section to a position fitting between the ends thereof.

4. A device of the character described including a split rim body, a rim section pivoted upon the rim body and adapted to freely separate therefrom at a point in its pivotal movement with respect to the rim body, a link plate pivoted upon the rim body and adapted to freely separate therefrom at a point in its pivotal movement with respect to the rim body, the rim section being formed with a substantially T-shaped opening, and a substantially T-shaped tongue carried by the link plate and engaging through said opening to connect the link plate and rim section for movement to spread the rim body and shift the rim section to a position fitting between the ends thereof, said tongue being normally locked in engagement with the rim section and being removable through said slot when the rim body is abnormally expanded.

5. A device of the character described including a split rim body, a rim section and link plate pivotally connected thereto and adapted to freely separate from the rim body at points in their pivotal movement with respect to the said body, the rim section being provided with an opening, a tongue carried by the link plate and removably engaging through said opening to pivotally connect the rim section and link plate for movement to spread the rim body and shift the rim section to a position fitting between the ends thereof, and pivot lugs carried by the link plate at opposite sides of said tongue and adapted to coact with the rim section for supporting the rim section to pivot relative to the link plate upon the inward swinging of the rim section.

6. A device of the character described including a split rim body, a rim section, a link plate pivoted thereon and respectively adapted to freely separate from the rim body at a point in their pivotal movement with respect thereto, the rim body being formed with a socket having an opening therein, a tongue carried by the link plate and engaging through said opening for normally locking the rim section and link plate upon the rim body and connecting said section and plate for movement to spread the rim body and shift the rim section to a position fitting between the ends thereof, one end of the rim body being formed with a notch, and a locking block carried by the link plate to engage in said socket and notch when the rim section is disposed between the ends of the rim body for locking the free extremity of the said section against transverse movement with respect to the rim body.

In testimony whereof I affix my signature.

JOSEPH H. M. MICHON. [L.S.]